United States Patent
Akiyama et al.

(10) Patent No.: US 7,404,426 B2
(45) Date of Patent: Jul. 29, 2008

(54) HYBRID CORD FOR RUBBER REINFORCEMENT AND RUBBER PRODUCT EMPLOYING THE SAME

(75) Inventors: Mitsuharu Akiyama, Osaka (JP); Takeshi Maeda, Osaka (JP); Yukinari Okuyama, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 322 days.

(21) Appl. No.: 10/866,876

(22) Filed: Jun. 15, 2004

(65) Prior Publication Data

US 2004/0226641 A1 Nov. 18, 2004

Related U.S. Application Data

(63) Continuation of application No. PCT/JP03/02764, filed on Mar. 10, 2003.

(30) Foreign Application Priority Data

Mar. 22, 2002 (JP) ............................ 2002-081257

(51) Int. Cl.
- *B60C 9/00* (2006.01)
- *D02G 3/00* (2006.01)
- *D02G 3/48* (2006.01)

(52) U.S. Cl. .................. 152/536; 57/210; 57/229; 57/902; 162/451; 162/557; 428/377

(58) Field of Classification Search .................. 57/210, 57/224, 229–232, 234, 902; 152/536, 557; 428/377

See application file for complete search history.

(56) References Cited

U.S. PATENT DOCUMENTS

| | | | | |
|---|---|---|---|---|
| 3,029,590 A | * | 4/1962 | Caroselli et al. | |
| 3,446,003 A | * | 5/1969 | Kolek et al. | ............... 57/902 X |
| 4,155,394 A | * | 5/1979 | Shepherd et al. | ........... 57/902 X |
| 4,389,839 A | * | 6/1983 | van der Werff | ............. 57/902 X |
| 4,852,625 A | * | 8/1989 | Mashimo et al. | ........ 152/557 X |
| 5,558,144 A | * | 9/1996 | Nakayasu et al. | |
| 5,922,259 A | * | 7/1999 | Okuyama et al. | |
| 5,948,186 A | * | 9/1999 | Yabuki | |
| 7,080,500 B2 | * | 7/2006 | Akiyama et al. | ........... 57/232 X |
| 2002/0095928 A1 | * | 7/2002 | Fidan et al. | ................... 57/210 |

FOREIGN PATENT DOCUMENTS

EP 0 293 263 11/1988

(Continued)

OTHER PUBLICATIONS

Mechanics of Pneumatic tires, ed. Samuel Clark, US Department of Transportation, Aug. 1981, pp. 61-62.*

*Primary Examiner*—Adrienne C Johnstone
(74) *Attorney, Agent, or Firm*—Manabu Kanesaka

(57) ABSTRACT

A hybrid cord 1 for rubber reinforcement comprises a strand 2 having higher elastic modulus, made of PBO fiber or the like, which is disposed at the center of the cord, and strands 3 having lower elastic modulus, made of glass fiber or the like, which are disposed therearound. The hybrid cord has enough strength and is excellent in flexural fatigue resistance, adhesion property relative to rubber, and dimensional stability. A rubber product employs this hybrid cord 1 for rubber reinforcement.

11 Claims, 3 Drawing Sheets

FOREIGN PATENT DOCUMENTS

| | | |
|---|---|---|
| JP | 64-70202 | 3/1989 |
| JP | U H02-17596 | 2/1990 |
| JP | 6-297905 | 10/1994 |
| JP | 06286409 A * | 10/1994 |
| JP | H06-300085 | 10/1994 |
| JP | 8174708 | 7/1996 |
| JP | H09-250041 | 9/1997 |
| JP | H10-329507 | 12/1998 |
| JP | 11-217739 | 8/1999 |
| JP | 11336847 | 12/1999 |
| JP | 2001-336038 | 12/2001 |
| WO | WO-01/18291 A1 * | 3/2001 |

* cited by examiner

Example 1

Example 2

Comparative Example 3

HYBRID CORD FOR RUBBER REINFORCEMENT AND RUBBER PRODUCT EMPLOYING THE SAME

CROSS REFERENCE TO RELATED APPLICATION

This is a continuation application of PCT/JP03/02764 filed on Mar. 10, 2003.

FIELD OF THE INVENTION

The present invention relates to a hybrid cord having excellent flexing resistance and dimensional stability for use in a reinforcement of rubber products such as a rubber belt and a rubber tire, and also relates to a rubber product reinforced with the hybrid cord.

BACKGROUND OF THE INVENTION

It is a common way that reinforcement members are embedded into rubber products including a rubber belt and a rubber tire, in order to improve the strength and the durability of the rubber products.

Specific examples of the reinforcement members include glass fiber, polyvinyl alcohol fiber as typified by vinylon fiber, polyester fiber, aliphatic polyamide fiber such as nylon and, aromatic polyamide fiber such as polyparaphenylene terephthalamide (hereinafter, called as "aramid"). Among these, the glass fiber and the aramide fiber are widely used.

Since a rubber product such as a rubber belt is repeatedly subjected to bending stress, flexural fatigue easily occurs so as to lower its performance. In addition, delamination between reinforcement fibers and rubber matrix may be caused and the reinforcement fiber may be worn so that the strength of the rubber product is easily lowered. A toothed belt used for driving a cam shaft in an internal combustion engine for automobiles requires high level of dimensional stability in order to provide suitable valve timing. Recently, since the toothed belt is used not only for driving the cam shaft but also for subsidiarily driving an injection pump and the like, high strength and high elastic force are required to withstand high load.

While high-strength glass fiber and aramide fiber have been mainly used as the fiber used for reinforcement of the belt, carbon fiber and polyparaphenylene benzo bis oxazole (hereinafter, abbreviated to "PBO") fiber have been recently proposed as new materials. Carbon fiber as used in belt tensile body for a toothed belt has been proposed in JPA H08-174708, and PBO fiber has been proposed in JPA H11-336847.

Any of conventional cords for rubber reinforcement made of the aforementioned reinforcement fiber is a cord formed by twisting strands of reinforcement fiber of one kind.

In the conventional cord for rubber reinforcement made of reinforcement fiber of one kind, it is difficult to balance the strength and the flexibility. For example, a cord employing PBO fiber has high tensile strength, but has a problem of being poor in flexibility because of poor compressive fatigue resistance. The PBO fiber can not provide enough adhesion property between the cord and the rubber as matrix. There is a desire for improved adhesion property. A cord employing glass fiber has excellent dimensional stability, but its strength retention is not enough when subjected to bending for a long time.

DISCLOSURE OF THE INVENTION

It is an object of the present invention to provide a hybrid cord for rubber reinforcement having enough strength and excellent flexural fatigue resistance and also having excellent adhesion property relative to rubber and dimensional stability and to provide a rubber product which is reinforced by this hybrid cord and has high strength, excellent bending property, excellent durability, and excellent dimensional stability.

A hybrid cord for rubber reinforcement of the present invention comprises fiber strands of two or more kinds having different elastic moduli which are twisted together. A fiber strand(s) having a higher elastic modulus is disposed at the center side of the cord and fiber strands having a lower elastic modulus are disposed at the skin side of the cord.

A rubber product of the present invention employs a hybrid cord for rubber reinforcement of the present invention.

DESCRIPTION OF THE PREFERRED EMBODIMENTS

In a hybrid cord for rubber reinforcement of the present invention, a fiber strand having a higher elastic modulus (hereinafter, sometimes called as "higher-modulus fiber strand") disposed at the center side of the cord imparts high tensile strength and excellent dimensional stability to the cord because of its characteristics. A fiber strand having a lower elastic modulus (hereinafter, sometimes called as "lower-modulus fiber strand") disposed at the skin side of the cord absorbs tensile stress and compressive stress when the cord and a matrix rubber reinforced by this cord are bent. As the fiber strands, fiber strands having excellent adhesion property relative to the rubber can be easily selected.

In the present invention, fiber strands having different elastic moduli are combined, thereby achieving a hybrid cord which is excellent in strength, dimensional stability, flexural fatigue resistance, and adhesion property relative to rubber.

According to the present invention, polyparaphenylene bezobisoxazole fiber (PBO fiber) is preferably employed as the fiber having higher elastic modulus to be disposed at the center side of the cord, while glass fiber is preferably employed as the fiber having lower elastic modulus to be disposed at the skin side of the cord.

The hybrid cord for rubber reinforcement of the present invention may be a naked hybrid cord of the present invention and may be a hybrid cord of which outer surface is overcoated with rubber as will be described in later.

Figure 1:
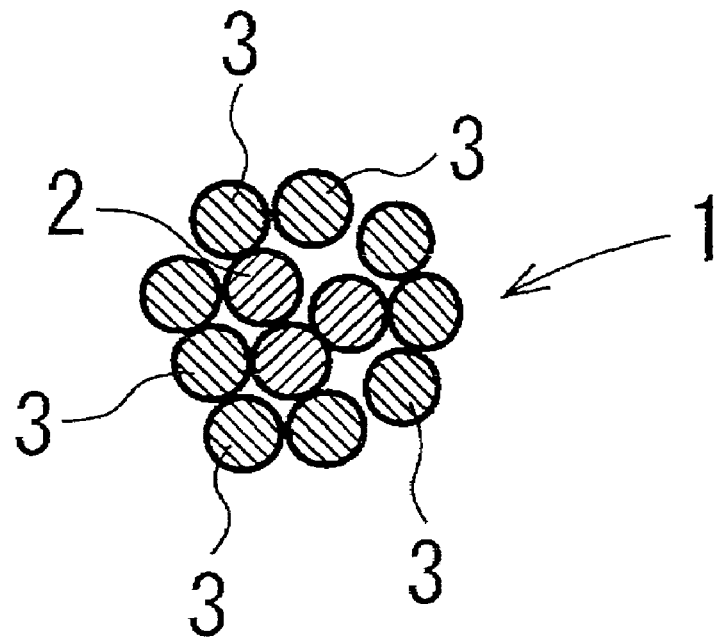
FIG. 1 is a sectional view of a hybrid cord for rubber reinforcement according to an embodiment.
Figure 2:
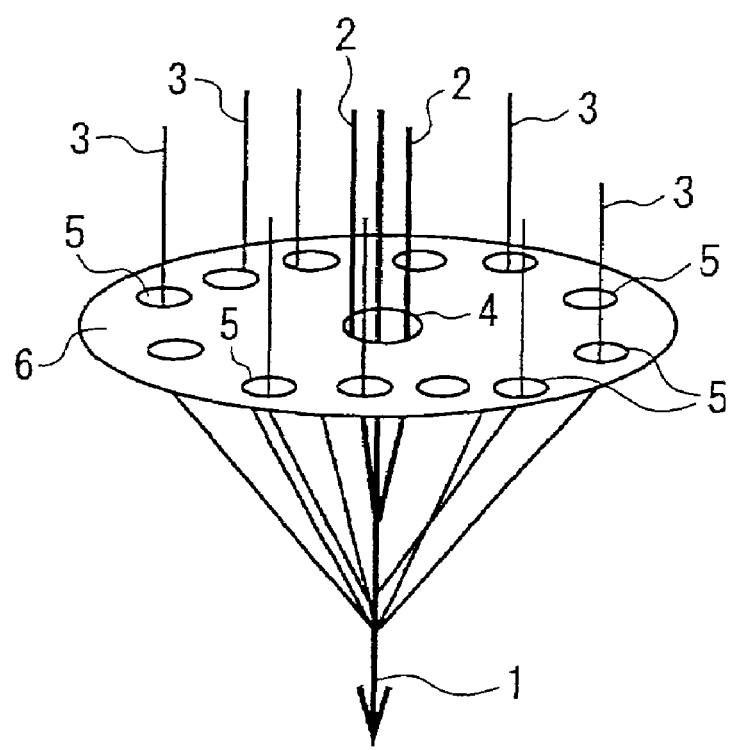
FIG. 2 is a perspective view schematically showing the manufacturing method of a hybrid cord for rubber reinforcement.

Hereinafter, a preferred embodiment of the present invention will be described with reference to drawings. FIG. 1 is a sectional view of a hybrid cord for rubber reinforcement according to an embodiment, and FIG. 2 is a perspective view schematically showing the manufacturing method of the hybrid cord for rubber reinforcement.

On fiber strands of two or more kinds used in the present invention, there is no special limitation besides that the used fibers have different elastic moduli. Examples of especially suitable fiber include PBO fiber, carbon fiber, glass fiber, and aramid fiber.

The hybrid cord for rubber reinforcement of the present invention comprises a higher-modulus fiber strand disposed at the center side and a plurality of lower-modulus fiber strands disposed around the higher-modulus fiber strand i.e. at the skin side of the hybrid cord.

The higher-modulus fiber strand preferably has an elastic modulus (Young's modulus) of 100 GPa or more, more preferably 120 GPa or more, especially from 120 to 400 GPa. Preferably used as fiber of the higher-modulus fiber strand may be PBO fiber having an elastic modulus from 170 to 280 GPa (having a density about 1.54 $g/cm^3$, 1250-2060 g/d), carbon fiber having an elastic modulus from 210 to 380 GPa (having a density 1.77 $g/cm^3$, 1340-2430 g/d), aramid fiber having an elastic modulus from 110 to 150 GPa (having a density of 1.45 $g/cm^3$, 860-1170 g/d), and the like.

The higher-modulus fiber strand disposed at the center side of the cord provides high strength and excellent dimensional stability to the cord because of its characteristics.

Greater proportion of the higher-modulus fiber strands relative to the entire strands of the cord improves the static strength but lowers the bending property. Accordingly, it is preferable that the proportion of the higher-modulus fiber strands is defined such that the total cross sectional area of the higher-modulus fiber strand is 40% or less of the total cross sectional area of the cord (in the state without overcoat. The same is true for the following.). When the proportion of the higher-modulus fiber strand is too small, the effect of the high-elastic fiber of improving the strength and the dimensional stability can not be obtained. Accordingly, it is preferable that the proportion of the higher-modulus fiber strands is defined such that the total cross sectional area of the higher-modulus fiber strand is 10% or more of the total cross sectional area of the cord.

Hereinafter, the percentage of the total cross sectional area of the higher-modulus fiber strand relative to the total cross sectional area of the hybrid cord (the total of cross sectional areas of fiber strands) will be referred to as "the occupied area percentage".

The higher-modulus fiber strand disposed at the center side may be coated with adhesives or twisted in order to improve the adhesion property and resistance against fray of strand. The adhesives maybe a treating liquid (hereinafter, referred to as "RFL") comprising, as a main component, a mixture of an initial condensation product of resorcin and formalin and rubber latex, epoxy, or isocyanate compound, but not limited thereto. The twisting rate of the higher-modulus fiber strand is preferably from 0 to 2.0 turns/25 mm.

The lower-modulus fiber strands disposed at the skin side of the cord are strands of fiber having an elastic modulus lower than that of the higher-modulus fiber strand at the center side. The periphery of the cord requires a structure of absorbing tensile stress and compressive stress when the cord and the matrix rubber reinforced by the cord are bent. According to the present invention, this required function can be obtained by arranging the lower-modulus fiber strands at the outer periphery side of the cord.

The lower-modulus fiber strand preferably has an elastic modulus less than 100 GPa, more preferably 90 GPa or less, especially from 60 to 90 GPa. Preferably used as fiber of the lower-modulus fiber strand may be, for example, glass fiber having an elastic modulus from 60 to 80 GPa (having a density about 2.5 $g/cm^3$, 280-350 g/d), aramid fiber having an elastic modulus about 60 GPa (having a density of 1.39 $g/cm^3$, 490 g/d), and the like.

The difference in elastic modulus between the higher-modulus fiber strand and the lower-modulus fiber strands is preferably 30 GPa or more, more preferably from 70 to 320 GPa.

The lower-modulus fiber strands at the periphery side of the cord preferably have adhesion property relative to the matrix rubber. Therefore, the lower-modulus fiber strands may be applied with treatment such as RFL or twisted. The twisting rate of the lower-modulus fiber strand is preferably from 1.5 to 3.5 turns/25 mm.

The RFL treatment is conducted by immersing filaments into the aforementioned RFL and then heating them. Examples of the rubber latex for used in the RFL include acrylic rubber based latexes, polyurethane based latexes, styrene-butadiene rubber based latexes, nitrile rubber based latexes, chlorosulfonated polyethylene based latexes, modified latexes thereof, and mixtures thereof, but not limited thereto.

Fiber strands are formed by bundling filaments of fiber treated by RFL treatment or the like if necessary to form strands and primarily twisting the predetermined number of strands if necessary.

The hybrid cord for rubber reinforcement according to the preferred embodiment shown in FIG. 1 comprises a plurality of PBO fiber strands 2 as the higher-modulus fiber strand disposed at the center side, and a plurality of glass fiber strands 3 as the lower-modulus fiber strands disposed therearound. Preferably used as the PBO fiber strand is a strand having a thickness of 1090-6540 tex formed by bundling 664-1984 PBO filaments each having a diameter of 10-14 μm and not primarily twisting or primarily twisting them.

Examples of glass fiber to be used as the glass fiber strand 3 include E glass fiber filaments and high strength glass fiber filaments. Preferably used as the glass fiber strand is a strand having a thickness of 20-120 tex formed by bundling 200-600 filaments each having a diameter of 7-9 μm and primarily twisting them.

To make a hybrid cord 1, a guide 6 having a center guide hole 4 and peripheral guide holes 5 as shown in FIG. 2 is preferably used. The peripheral guide holes 5 are arranged at equal distance in the radial direction from the center of the center guide hole 4.

The inner peripheral edges of the holes 4 and 5 are formed by ceramic having high sliding property. A plurality of non-twisted PBO fiber strands 2 or primarily twisted PBO fiber strands 2 are brought to pass through the center guide hole 4. Grass fiber strands 3, preferably primarily twisted, are brought to pass through the plural peripheral guide holes 5. These strands 2 and 3 are twisted together by final twist to form the hybrid cord 1. The twisting rate of this final twist is preferably from 1.0 to 10 turns/25 mm.

The hybrid cord composed of the PBO fiber strands and the glass fiber strands may be structured to have [1]/[3-30], [2]/[6-30], or [3]/[10-40] as [number of PBO fiber strands]/[number of glass fiber strands]. The PBO strands may have poorer adhesion property relative to the rubber matrix than that of the glass fiber strand. Therefore, the PBO fiber strands are preferably surrounded by the glass fiber strands to prevent the PBO fiber strands from being directly in contact with the rubber matrix.

There is no special limitation on the apparatus of bundling and twisting fiber strands for the hybrid cord of the present invention. This apparatus may be any apparatus such as a ring twisting frame, a flyer twisting frame or a spinning machine.

To impart higher bonding strength relative to the matrix rubber to the cord, the surface of the hybrid cord may be further applied with another adhesive agent. Alternatively, the hybrid cord may be overcoated with rubber to form a rubber coat in order to enhance affinity relative to the rubber. As the rubber for the overcoat, hydrogenated nitrile rubber, chlorosulfonated polyethylene rubber (CSM), chloroprene rubber, natural rubber, urethane rubber and the like may be used with crosslinking agent. The rubber for the overcoat is selected from the known rubber materials, depending on the kind of the matrix rubber.

The hybrid cord for rubber reinforcement of the present invention may comprise fiber strands of two kinds having different elastic moduli or fiber strands of three or more kinds having different elastic moduli. In case of a cord comprising fiber strands of three or more kinds having different elastic moduli, the fiber strands are preferably arranged such that fiber strand(s) having the highest elastic modulus is disposed at the most center side of the cord and lower-modulus fiber strand is disposed nearer to the periphery of the cord.

The hybrid cord for rubber reinforcement of the present invention is suitably used as the cord for rubber reinforcement for reinforcing a rubber belt such as a conveyer belt or a rubber tire and may be used for reinforcing other rubber products.

It is preferable that about 10 to 70% by weight of the hybrid cord is contained in the rubber product.

Hereinafter, the present invention will be described in further detail with reference to Examples and Comparative Examples.

EXAMPLE 1

Figure 3A:
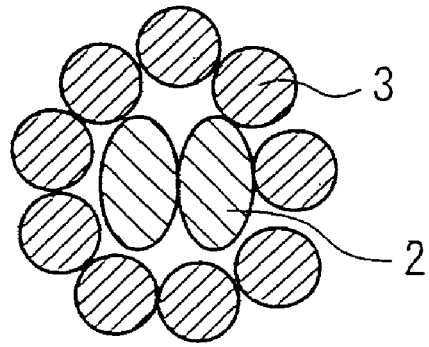
FIG. 3a is a sectional view of the arrangement of strands in a hybrid cord for rubber reinforcement manufactured as Example 1.

PBO fiber strands having 160 tex (outer diameter: about 0.4 mm, filament diameter: 12 μm, the number of filaments: 996, elastic modulus: 270 GPa, density: about 1.54 g/cm$^3$, without being twisted, and available from Toyobo Co., Ltd.) were prepared. Grass fiber strands of E glass constituent having about 100 tex (outer diameter: about 0.35 mm, filament diameter: 9 μm, the number of filaments: 600, elastic modulus: 70 GPa, density: about 2.5 g/cm$^3$, the amount of adhering of RFL: 20% by weight, and available from Nippon Sheet Glass Co., Ltd.) were prepared by immersing filaments into a RFL (resorcinol formaldehyde condensation (58% by weight in solid state): vinyl pylidine-styrene-butadiene latex (40% by weight in solid state): styrene-butadiene latex (45% by weight in solid state)=155: 150: 90 (weight ratio)) and heating them (drying at 180° C. for 120 seconds), and then primarily twisting them at 2.0 turns/25 mm. Two PBO fiber strands were disposed at the center side of a cord and nine glass fiber strands were disposed at the skin side of the cord to have an array as shown in FIG. 3a. These fiber strands in this array were primarily twisted at 2.0 turns/25 mm, thereby forming a hybrid cord (outer diameter: about 1 mm). The occupied area percentage of the PBO fiber strands in the cord and the yardage of the cord (the weight (g) per a length of 1000 m) are shown in Table 3. The cord was applied with a second treatment liquid of a composition shown in Table 1 and was dried. The tensile strength and the elongation at break were measured. The amount of adhering of second treatment agent in the solid state was 5% by weight.

TABLE 1

| Composition of Second Treatment Liquid (parts by weight) | |
|---|---|
| Methylenebis(4-phenylisocianate) | 4.5 |
| CSM (available from Tosoh Corporation, trade name: TS-340, chlorine content: 43% by weight, sulfur content: 1.1% by weight) | 5.25 |
| p-dinitroso benzene | 2.25 |
| Carbon black | 3.0 |
| Mixed solvent of xylene and trichlormethylene (Mixing ratio of xylene and trichlormethylene (weight ratio) = 1.5:1.0) | 85.0 |

After that, 25 cords which were formed by cutting a cord into 40 mm in length were aligned in parallel on a matrix rubber sheet (25 mm×40 mm×1 mm) having the constituent parts shown in Table 2. Then, another matrix rubber sheet having the same dimensions was superposed on them. They were pressed at 150° C. for 20 minutes from both surface sides so as to vulcanize the matrix rubber sheets.

TABLE 2

| Composition of Matrix Rubber sheet (parts by weight) | |
|---|---|
| Hydrogenated acrylonitrile-butadiene rubber Zetpol 2020 (available from Zeon Corporation) | 100 |
| Zinic Oxide No. 1 | 5 |
| Stearic acid | 1 |
| HAF carbon | 60 |
| Trioctyl trimellitate | 10 |
| 4,4-(α,α-dimethyl benzyl)diphenylamine | 1.5 |
| 2-mercapto benzimidazole zinc salt | 1.5 |
| Sulfur | 0.5 |
| Tetramethyl thiramsulfide | 1.5 |
| Cyclohexyl-benzothiazylsulfenic amide | 1 |

In the pressed vulcanized sheet, ends of the fiber cords and an end of one of the rubber sheets were caught separately by two clips and the cords were torn from the sheet by pulling the clips apart vertically. The torn surface was observed for the bonding condition.

In addition, a cord (300 mm in length) was sandwiched between two matrix rubber sheets of 10 mm in width, 300 mm in length, 1 mm in thickness and having the same composition as the above. Then, they were pressed in the same manner to vulcanize the matrix rubber sheets, thereby preparing a test piece of flat band shape.

Figure 4:
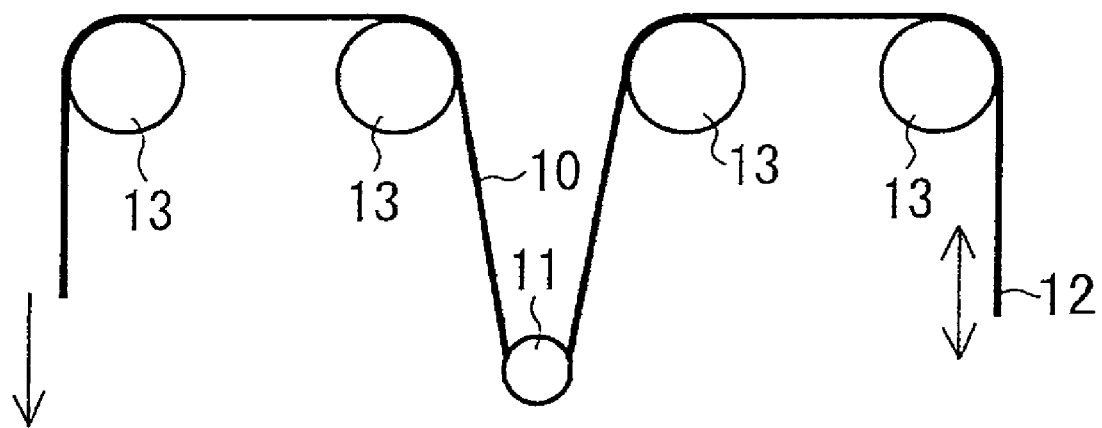
FIG. 4 is an illustration for explaining the test method for flexural characteristics in Examples and Comparative Examples.

As shown in FIG. 4, the test piece 10 was set in a bending test machine comprising a single flat pulley 11 of 25 mm in diameter, a motor (not shown), four guide pulleys 13 so that the test piece 10 was held by the pulleys 11, 13. A weight was attached to one end of the test piece 10 and an initial tension of 9.8 N was applied to the test piece 10. In this state, the other end 12 of the test piece 10 was reciprocated 10 cm in the direction of double arrow in FIG. 4 by using the motor so that the test piece 10 was bent repeatedly at a portion wound around the flat pulley 11. The test piece was bent by reciprocation of 1000 times at a room temperature. The tensile strength (par one cord) after the bending test was measured for evaluating the flexural fatigue resistance thereof. The ratio of the tensile strength relative to the tensile strength before the bending test was obtained as the retention of tensile strength (%)

Table 3 shows the evaluation results of the cord including the tensile strength, the elongation at break, the bonding condition relative to the matrix rubber, and the retention of tensile strength after the bending test.

EXAMPLE 2

Figure 3B:
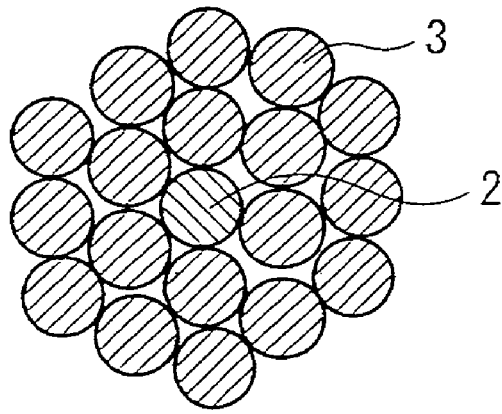
FIG. 3b is a sectional view of the arrangement of strands in a hybrid cord for rubber reinforcement manufactured as Example 2.

A cord was manufactured in the same manner as Example 1 except that a single PBO fiber strand mentioned above and eighteen glass fiber strands mentioned above were used and arranged to have an array shown in FIG. 3b. The cord was evaluated in the same manner as Example 1. The evaluation results are shown in Table 3.

COMPARATIVE EXAMPLE 1

A cord was manufactured in the same manner as Example 1 except that two glass fiber strand mentioned above were used instead of the two PBO fiber strands used in Example 1 and the eleven strands composing the cord were all glass fiber strands treated by RFL treatment. The cord was evaluated in the same manner as Example 1. The evaluation results are shown in Table 3.

COMPARATIVE EXAMPLE 2

A cord was manufactured in the same manner as Example 2 except that a single glass fiber strand mentioned above was used instead of the PBO fiber strand used in Example 2 and the nineteen strands composing the cord were all glass fiber strands treated by RFL treatment. The cord was evaluated in the same manner as Example 2. The evaluation results are shown in Table 3.

COMPARATIVE EXAMPLE 3

Figure 3C:
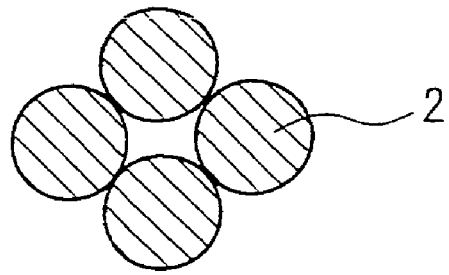
FIG. 3c is a sectional view of the arrangement of strands in a cord for rubber reinforcement manufactured as Comparative Example 3.

A cord was manufactured in the same manner as Example 1 except that strands are arranged to have an array as shown in FIG. 3c and the four strands composing the cord were all PBO fiber strands treated by RFL treatment. The cord was evaluated in the same manner as Example 1. The evaluation results are shown in Table 3.

TABLE 3

|  | Examples | | Comparative Examples | | |
|---|---|---|---|---|---|
|  | 1 | 2 | 1 | 2 | 3 |
| Hybrid Cord | | | | | |
| Total number of strands | 11 | 19 | 11 | 19 | 4 |
| Number of Glass fiber strands | 9 | 18 | 11 | 19 | 0 |
| Number of PBO fiber strands | 2 | 1 | 0 | 0 | 4 |
| Occupied area percentage (%) | 37 | 13 | 0 | 0 | 100 |
| Yardage (g/1000 m) | 1538 | 2433 | 1420 | 2553 | 1800 |
| Evaluation | | | | | |
| Tensile Strength (N/cord) | 1400 | 1650 | 885 | 1400 | 1700 |
| Elongation at break (%) | 3.0 | 3.2 | 3.2 | 4.2 | 3.0 |
| Bonding condition relative to rubber | Rubber rupture | Rubber rupture | Rubber rupture | Rubber rupture | Fiber separation |
| Retention of tensile strength (%) | 80 | 85 | 70 | 70 | 50 |

As apparent from Table 3, the cords of Comparative Examples 1 and 2 in which only the glass fiber strands are used have well adhesion property relative to rubber, but have poor tensile strength and insufficient retention of tensile strength. The cord of Comparative Example 3 in which only the PBO fiber strands are used has high tensile strength, but has poor adhesion property relative to rubber and low retention of tensile strength.

The hybrid cords of Examples 1 and 2 in which the PBO fiber strand(s) are arranged at the center side of the cord and the glass fiber strands are arranged at the skin side have excellent characteristics in all of tensile strength, elongation at break, adhesion property relative to rubber, and retention of tensile strength.

INDUSTRIAL APPLICABILITY

As apparent from the aforementioned results, the present invention can provide a hybrid cord for rubber reinforcement having suitable tensile strength enough for use as a cord for rubber reinforcement and also having excellent flexural fatigue resistance, excellent adhesion property relative to rubber, and excellent dimensional stability, and also can provide a rubber product, such as a rubber belt, which is reinforced by this hybrid cord and has high strength, excellent bending property, excellent durability, and excellent dimensional stability.

What is claimed is:

1. A hybrid rubber reinforcement cord comprising fiber strands of two or more kinds having different elastic moduli which are twisted together, wherein at least one higher-modulus fiber strand having a higher elastic modulus is disposed at a center side of the cord and lowermodulus fiber strands having a lower elastic modulus are disposed at a skin side of the cord,
   wherein the lower-modulus fiber strands are twisted around the at least one higher modulus fiber strand but not twisted around each other at the skin side of the cord,
   wherein the higher-modulus fiber strand is made of polyparaphenylene benzobisoxazole fiber and the lower-modulus fiber strand is made of glass fiber,
   wherein a total cross sectional area of the higher-modulus fiber strand is in a range from 10 to 40% of a total cross sectional area of the cord,
   wherein a twisting rate of the higher-modulus fiber strand is 0-2.0 turns/25 mm; and
   wherein a twisting rate of the lower-modulus fiber strand is 1.5-3.5 turns/25 mm.

2. A hybrid rubber reinforcement cord as claimed in claim 1, wherein the elastic modulus of the higher-modulus fiber strand is 120 GPa or more and the elastic modulus of the lower-modulus fiber strand is 90 GPa or less.

3. A hybrid rubber reinforcement cord as claimed in claim 2, wherein the elastic modulus of the higher-modulus fiber strand is in a range. from 120 to 400 GPa and the elastic modulus of the lower-modulus fiber strand is in a range from 60 to 90 GPa.

4. A hybrid rubber reinforcement cord as claimed in claim 1, wherein the difference in elastic modulus between the higher-modulus fiber strand and the lower-modulus fiber strand is 30 Gpa or more.

5. A hybrid rubber reinforcement cord as claimed in claim 4, wherein the difference in elastic modulus between the higher-modulus fiber strand and the lower-modulus fiber strand is in a range from 70 to 320 Gpa.

6. A hybrid rubber reinforcement cord as claimed in claim 1, wherein the lower-modulus fiber strand is treated with a treating liquid comprising, as a main component, a mixture of rubber latex and a product, said product being an initial condensation product of resorcin and formalin.

7. A hybrid rubber reinforcement cord as claimed in claim 1, wherein the twisting rate of the final twist of the cord is 1.0-10 turns/25 mm.

8. A hybrid rubber reinforcement cord as claimed in claim 1, wherein the outer surface of the cord is overcoated with rubber.

9. A rubber product employing a hybrid rubber reinforcement cord as claimed in claim 1.

10. A rubber product as claimed in claim 9, wherein the content of the hybrid cord is in a range from 10 to 70% by weight.

11. A rubber product as claimed in claim 9, wherein the rubber product is a rubber belt or a rubber tire.

* * * * *